United States Patent

[11] 3,630,244

| [72] | Inventors | Jeff Y. Cromeens<br>Mesquite;<br>Thomas E. Clyce, Garland, both of Tex. |
|---|---|---|
| [21] | Appl. No. | 24,788 |
| [22] | Filed | Mar. 27, 1970 |
| [45] | Patented | Dec. 28, 1971 |
| [73] | Assignee | Industrial Woodworking Machine Co., Inc.<br>Garland, Tex. |

[54] SAW APPARATUS WITH LATERALLY ADJUSTABLE SAWS
33 Claims, 9 Drawing Figs.

[52] U.S. Cl. .................................................. 143/37 B,
83/433, 83/665
[51] Int. Cl. .................................................. B27b 5/34
[50] Field of Search .......................................... 143/37 B,
37; 83/433, 498, 499, 504, 665

[56] References Cited
UNITED STATES PATENTS
1,150,551  8/1915  Sparks ........................... 143/37 B
2,507,644  5/1950  Peters ............................ 143/37 B
2,961,015  11/1960 Randall .......................... 143/37 B Primary Examiner—Donald R. Schran
Attorney—Schley & Schley ABSTRACT: A saw apparatus having an arbor assembly and coacting actuating means, the assembly comprising a plurality of saws secured to the adjacent ends of telescopic shafts of progressively inward increasing length supported by and having slidable connection with a longer rotatable axle by common driving means. Preferably, the slidable connection includes coacting keys and keyways extending longitudinally of the drive means, shafts and axle with adjacent keyways being relatively staggered and spaced progressively outward toward the saws. The actuating means may include pressure fluid cylinders, having piston rods projecting toward the saws and attached to the opposite adjacent ends of the saw shafts with the cylinders and rods of the longer shafts being movable with the reciprocation of the rods and cylinders of the intermediate shafts and the piston rod of the shortest shaft, and thrust members for movably supporting said cylinders of said longer saw shafts and all of said piston rods as well as permitting relative reciprocation of the latter cylinders.

INVENTORS
JEFF Y. CROMEENS
THOMAS E. CLYCE
BY *Shley & Shley*
ATTORNEYS

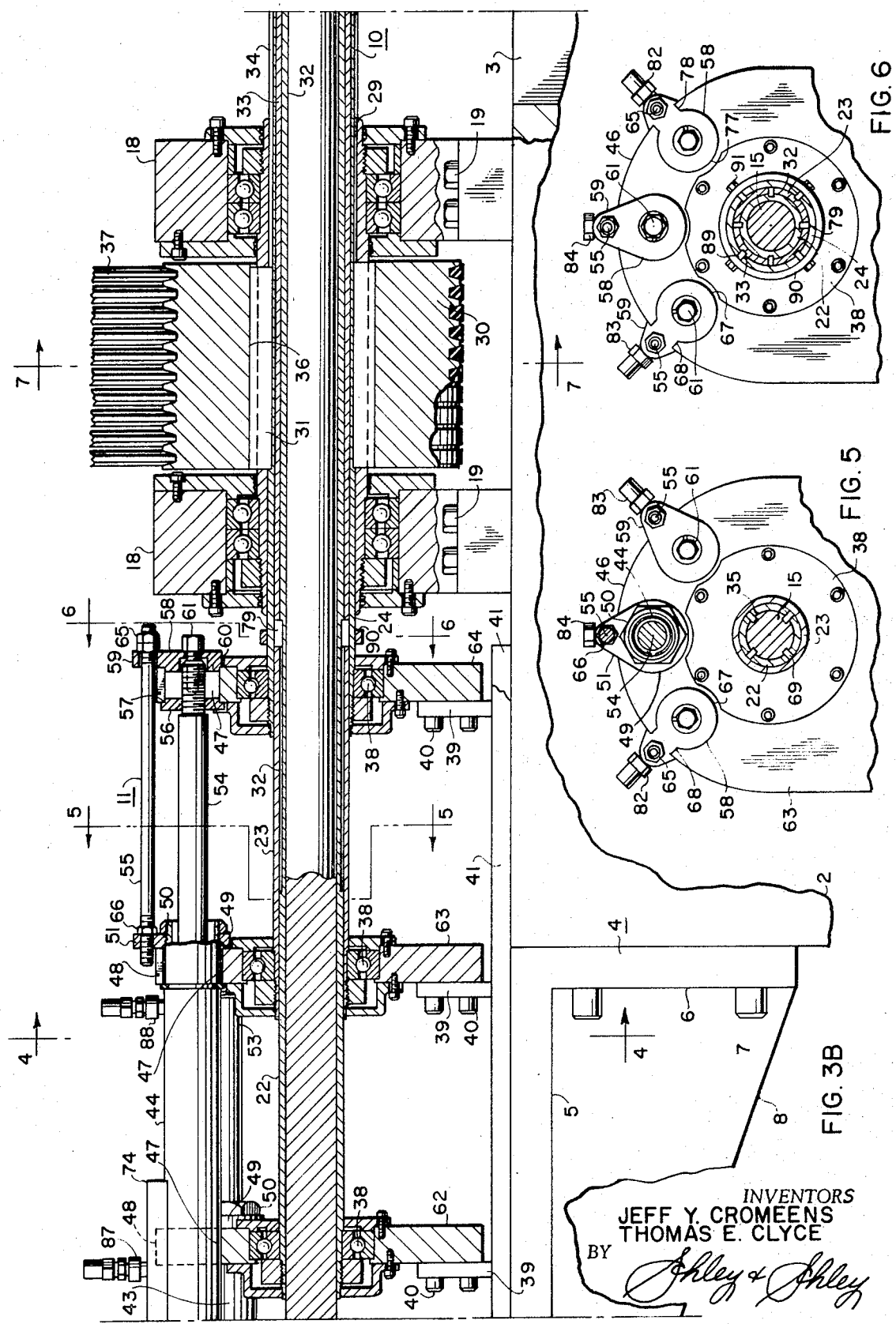

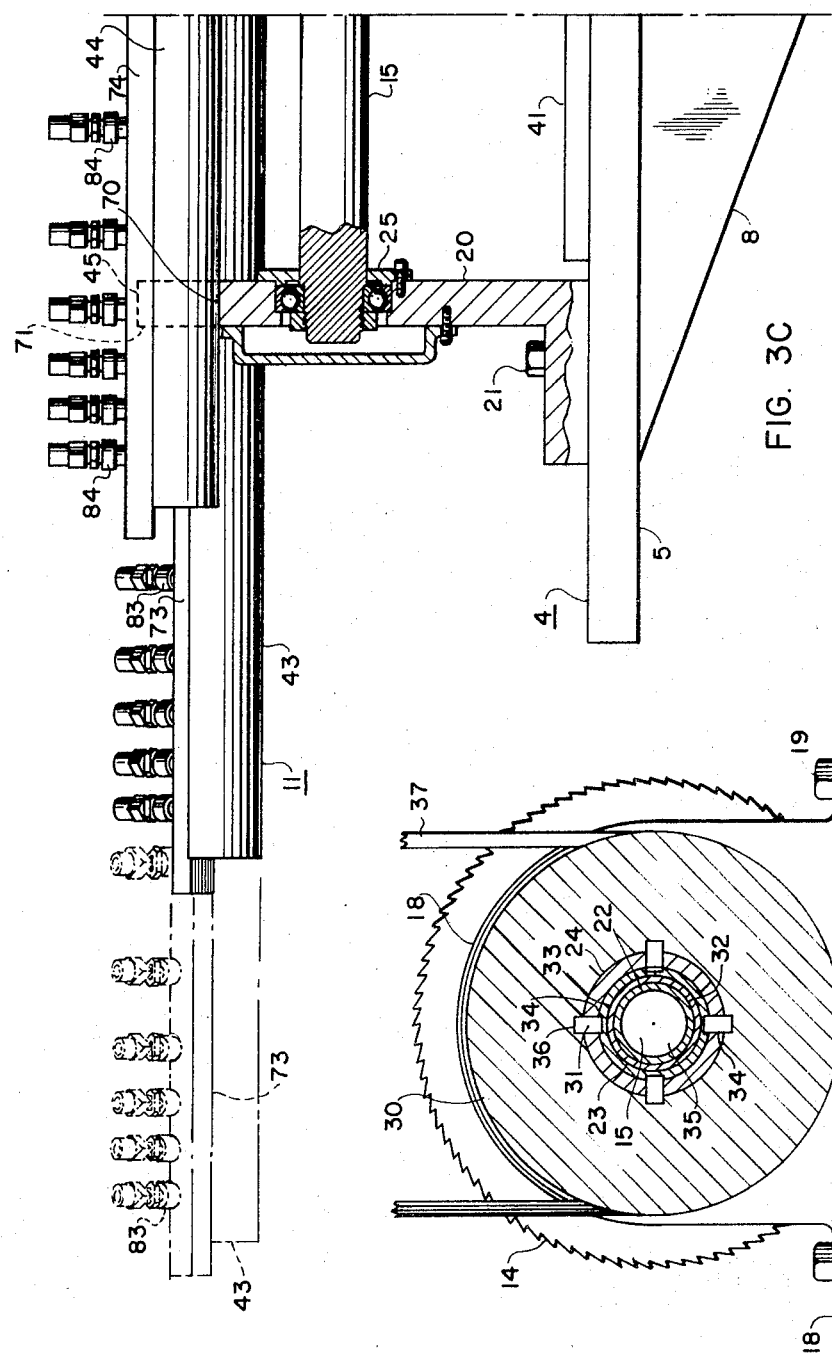

SAW APPARATUS WITH LATERALLY ADJUSTABLE SAWS

SUMMARY OF THE INVENTION

This invention relates to a novel saw apparatus for ripping lumber or other relatively thin material which is, usually, of greater length than width and which requires variation between the widths of the cuts due to defects therein, such as knots in lumber. Although this type of saw apparatus is well known, the previous apparatuses have been rather cumbersome and/or excessively expensive and have not supplied the demand for an economical and yet relatively efficient saw apparatus requiring minimal labor. Primarily, the saw apparatus consists of an arbor assembly having a plurality of saws or cutters fastened to the adjacent ends of telescopic tubular shafts or tubes of progressively outward decreasing length which have one of their end portions supported by a rotatable center shaft or axle and which have connection with a common drive pulley or sheave by a plurality or sets of keys or splines and coacting with radial channels or keyways in the sheave, tubular shafts and axle extending longitudinally thereof. The keyways of the axle and tubular shafts may be of substantially the same greater length and the sets thereof preferably are offset or staggered relatively to adjacent sets of keyways and are spaced longitudinally and progressively outward toward the saws whereby adjacent sets of keyways are misaligned so as to minimize weakening of the tubular shafts.

In part, a rotatable support for the arbor assembly is provided by means of thrust members which are movable longitudinally of the axle and which, preferably, support the elements of the actuating means as well as one of the end portions of said assembly. For purposes of illustration, the actuating means is depicted herein as including pressure fluid cylinders (one for each saw shaft) having piston rods projecting toward the saws with the cylinders and rods connected to the thrust members in such manner that the reciprocation of the piston rods of the shorter saw shafts is imparted to the cylinders and rods of the longer saw shafts. Necessarily, the thrust plates must be constructed so as to accommodate the relative movement of the cylinders and permit movement of the piston rods of the longer saw shafts relative to said plates.

BRIEF DESCRIPTION OF THE DRAWINGS

FIG. 3A is a longitudinal, vertical, sectional view, taken on the line 3—3 of FIG. 2, showing the right end portion of said apparatus and the channel or keyway of the outermost tubular shaft or tube, with a left position of the saws being shown in broken lines, FIG. 3B is a similar continuational view of FIG. 3A, partly in elevation, showing the midportion of said saw apparatus and the keys for connecting the sheave and its mounting sleeve to said outermost tubular shaft and the latter to the intermediate tubular shaft, FIG. 3C is a side elevational continuational view of FIG. 3B, partly in section, showing the left end portion of said apparatus, FIG. 5 is a view similar to FIG. 4, taken on the line 5—5 of FIG. 3B, also showing said innermost keys as well as the slots of said innermost tubular shaft, FIG. 6 is a view, similar to FIG. 4 and taken on the line 6—6 of FIG. 3B, showing the keys of said apparatus for connecting said outermost tubular shaft to said intermediate tubular shaft as well as the keys for connecting said intermediate shaft to said innermost tubular shaft, and FIG. 7 is a view similar to FIG. 4, taken on the line 7—7 of FIG. 3B, showing the keys for connecting said sheave and its mounting sleeve to said outermost tubular shaft.

DESCRIPTION OF THE PREFERRED EMBODIMENT

Figure 1:
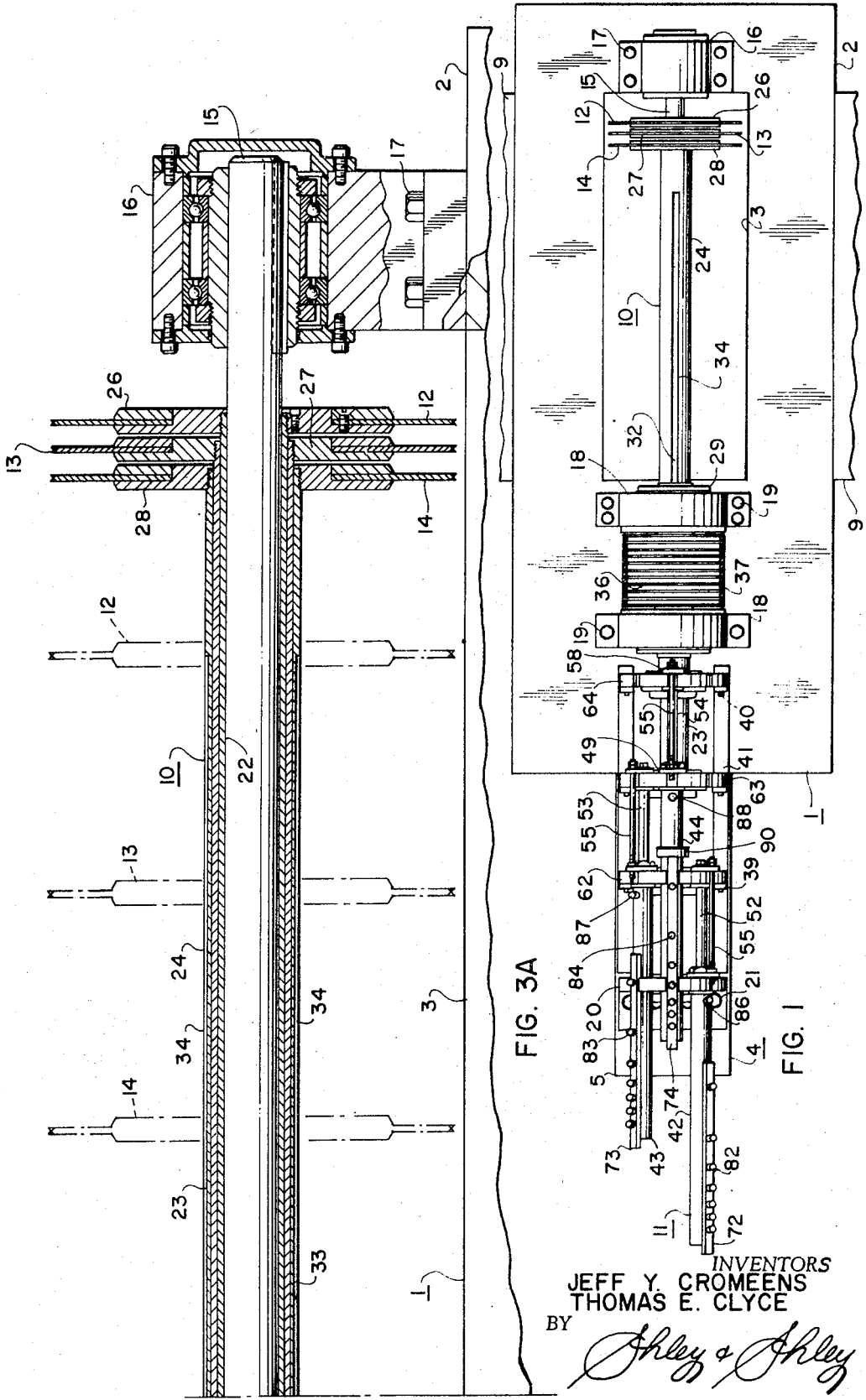
FIG. 1 is a top plan view of a saw apparatus having an adjustable arbor assembly constructed in accordance with the invention and adjusted to the far right.
Figure 2:
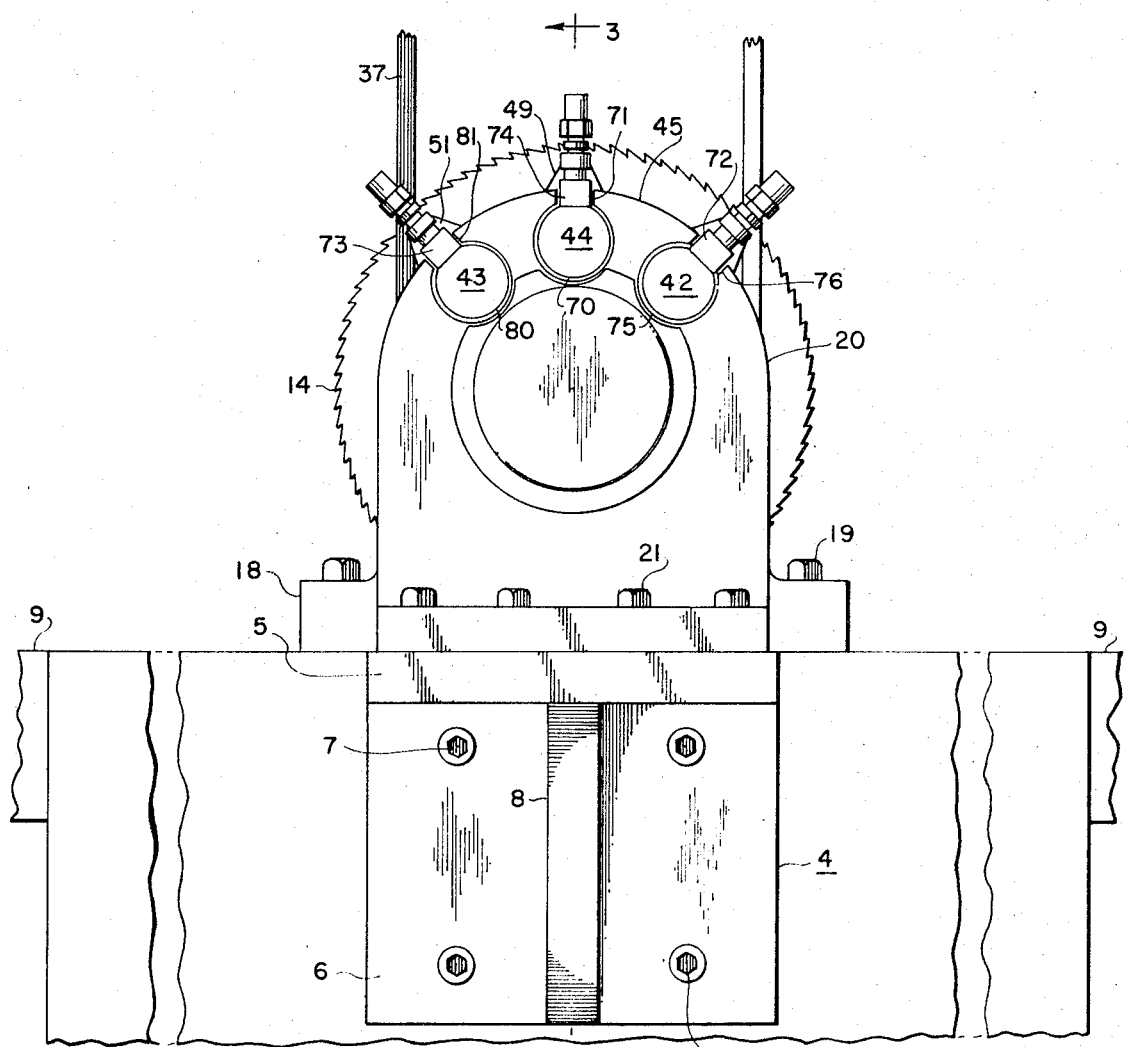
FIG. 2 is an end elevational view of the saw apparatus on an enlarged scale.
Figure 4:
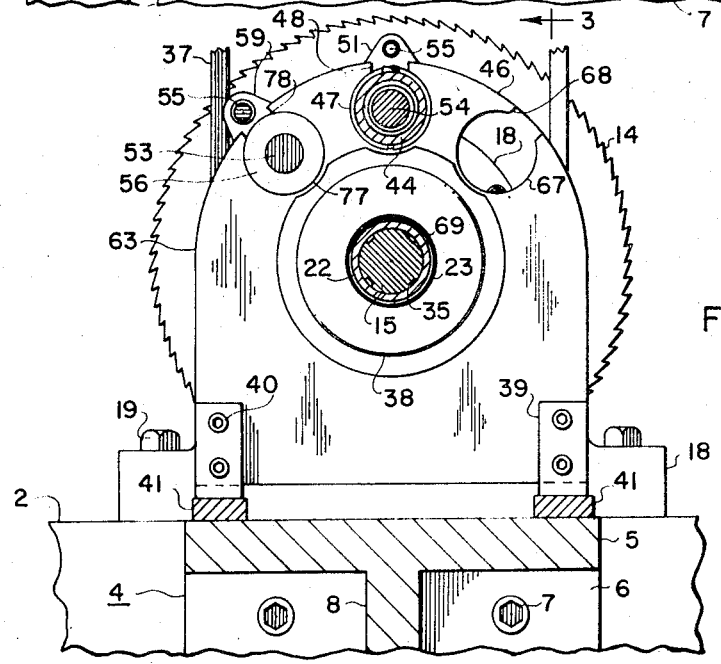
FIG. 4 is a transverse, vertical, sectional view taken on the line 4—4 of FIG. 3B and showing the keys for connecting the innermost tubular shaft to the axle or center shaft of said apparatus.

In the drawings, the numeral 1 designates a saw apparatus, embodying the principles of the invention, which includes an elongate horizontal base or frame 2 having an elongate rectangular sawdust pit or opening 3 extending longitudinally of its medial and one of its end portions. At its opposite or left end as shown in FIGS. 1, 2, 3B, 3C and 4, the base 2 may have an elongate rectangular extension or shelf 4 of relatively narrow width secured to and projecting longitudinally from and medially of said end. Usually and as illustrated, this type of shelf includes a flat top plate 5 coplanar with the top of the base and having an upright depending flange or leg 6 secured by suitable bolts 7 to the vertical left end wall of said base. An upright brace or reinforcing plate 8 extends longitudinally and medially of the top plate 5 and leg 6 whereby the shelf 4 is T-shaped (FIGS. 2 and 4) in cross section. A pair of opposed tables, portions of which are shown at 9 in FIGS. 1 and 2, extend transversely from the sides of the base 2 in substantially aligned normal relation to its sawdust pit 3 for slidably supporting lumber or other material being ripped or sawn. Also, the saw apparatus 1 comprises a saw arbor assembly 10 extending longitudinally of and mounted on the base in medial, overlying relation to its sawdust pit and adapted to be operated by any suitable mechanism, such as an hydraulic or other pressure fluid actuator or cylinder assembly 11, which may be supported by the shelf 4 and the adjacent or left end portion of the base or in any other manner.

The saw arbor assembly 10 includes a plurality of cutters or saws 12, 13 and 14, usually circular as shown, overlying the sawdust pit 3 and respectively mounted on the right ends of telescopic tubular shafts or tubes 22, 23 and 24, of progressively decreasing length outwardly, with the inner longest shaft or tube 22 being telescoped on a longer axle or solid center shaft 15. Manifestly, the number of saws and their shafts are subject to variation since any practicable quantity, such as six, may be provided. Only three each are depicted for purposes of convenient illustration, it being noted that the sawdust pit is of sufficient length to accommodate more saws than are shown. A more or less conventional bearing 16 (FIGS. 1 and 3A) upstands from the right end of the base 2 and is secured thereto contiguous its pit 3 by suitable bolts 17 for rotatably supporting the right end of the axle 15; while a pair of similar spaced bearings 18 are bolted, as shown at 19, to said base adjacent the left end of said pit and has the left end portion of the outer shortest tubular shaft or tube 24 journaled therein, said axle and all of the shafts projecting to the left beyond the latter bearings in overlying relation to the shelf 4. The left extremity of the axle 15 is rotatably supported (FIG. 3C) by a bearing 25 mounted in an upright L-shaped plate or angular bracket 20 upstanding from and secured to the outer end portion of the shelf by bolts 21.

Referring again to FIG. 3A, the saws 12-14 have respective hubs 26-28 suitably attached to the right extremities of the respective tubular shafts 22-24, such as by screw-threaded engagement; and an elongate collar or sleeve 29, having its ends journaled in the spaced bearings 18, is telescoped on the outer shortest tubular shaft 24. For driving the axle 15 as well as the tubes or tubular saw shafts, a pulley or sheave 30 is keyed or splined to the sleeve 29 and shaft 24 by a plurality or set (such as four as shown) of equally spaced, elongate, rectangular splines or keys 31 extending radially through a like number of complementary longitudinal slots or elongate openings (FIGS. 1-3B and 7) in said sleeve and engaging in a like number of complementary longitudinal channels or keyways 36 and 34 in the exterior of said tubular shaft and the bore of said sleeve, respectively, the channels 34 of said shaft being of greater length than the keys and said keys, slots, and channels being equally spaced circumferentially of the sheave, sleeve and shaft. In turn, the pulley or sheave 30 is driven by a multiplicity of endless belts 37 having an overhead drive which is not illustrated.

Similar pluralities or sets of keys or similar longer splines and slots or elongate openings 89, 79 and 69 (FIGS. 6, 5 and 3B) are provided for respective drivingly connecting the outer tubular shaft 24 to the intermediate tubular shaft 23, the latter shaft to the inner tubular shaft 22 and said inner shaft to the axle or center shaft 15. As best shown in FIGS. 3B and 6, outward displacement of the keys 89 from the complementary slots of the outer tubular shaft is prevented by an external retaining ring or collar 90 which encircles said shaft and is secured by screws 91 to said keys in overlying relationship. The shafts 23 and 22 and axle have pluralities or sets of elongate longitudinal channels or keyways 33, 32 and 35 (FIGS. 6, 15, 4 and 3B) in their respective exteriors for receiving the inner margins of the respective keys 89, 79 and 69 and thereby provide slidable and rotatable driving connections between said shafts 24 and 23, between said shafts 23 and 22 and between said shaft 22 and axle. Each of the coacting sets of keys 89, 79 and 69 as well as the channels 33, 32 and 35 of the shafts 23 and 22 and axle 15 are offset or staggered relative to adjacent sets of keys and channels radially as well as being spaced longitudinally and progressively inward radially toward the key 31 and channels 36 and 34 of the sheave 30 and shaft 24, whereby each coacting set is misaligned relative to contiguous sets so as to reduce weakening as well as distortion of the sleeve and tubular shafts to a minimum and provide adequate driving connection therebetween without interfering with reciprocation of said tubular shafts relative to said axle and sheave as well as to the sleeve 29 and whereby relative reciprocation of each shaft is permitted for positioning the saws 12-14 with respect to one another. It is noted that the rotativeness of the axle permits the mounting of a cutter (not shown) thereon.

The actuator assembly 11 may, as disclosed in our copending application Ser. No. 765,290, comprise a plurality of identical hydraulic or other pressure fluid cylinders 42-44 and identical piston rods 52-54, one of each for each of the tubular saw shafts 22-24, overlying and extending longitudinally of the elongate shelf 4 and the contiguous end portion of the base 2. A plurality of identical upstanding thrust members or plates 62-64 (FIGS. 1, 3B, 4-6 and 8) and the end bracket 20 (FIGS. 1, 2, 3C and 8) coact to support the cylinders 42-44 and piston rods 52-54, said bracket functioning as a thrust plate or member and its upper portion having the inner or right end of the cylinder 42 of the inner longest saw shaft 22 secured thereto whereby said cylinder projects outwardly beyond and to the left of the shelf. A suitable bearing 38 (FIG. 3B) is mounted in the medial portion of each of the thrust plates 62-64 and has one of the saw shafts extending therethrough and journaled therein so as to permit relative longitudinal movement of said thrust plates as well as rotation of said shafts. Each of the thrust plates is slidably mounted by an upright pair of spaced feet or lugs 39, depending from its lower portion and adjustably connected thereto by a pair of vertically aligned bolts 40, riding on a spaced pair of parallel elongate rails or track members 41 (FIGS. 3B and 4) secured to the base and shelf in overlying longitudinal relationship. Preferably and as shown at 45 in FIG. 2 and at 46 in FIGS. 4-6, the bracket 20 and thrust plates 42-44 have arcuate or semicircular upper margins.

The inner or right ends of the cylinders 43 and 44 are fastened to the thrust plates 62 and 63, respectively, and the piston rods 53 and 54 have their respective outer or right ends attached to the thrust plates 63 and 64. Due to this arrangement, the cylinders 43 and 44 are reciprocal relative to each other and to the cylinder 42 in addition to each of the piston rods 52-54 being reciprocal relative to its respective cylinder. Typical mountings for each cylinder inner or right end and each piston rod are depicted in FIGS. 3B and 4-6 wherein the cylinder 44 and piston rod 54 of the outer shortest tubular saw shaft 24 are fully illustrated. The thrust plate 63, as does each of the thrust plates, has a circular opening 47 (FIGS. 3B and 4) extending transversely through its medial upper portion adjacent its arcuate upper margin 46, for receiving the cylinder end, and communicating with an overlying aligned slot or rectangular opening 48 of comparatively narrow width in said margin.

As shown in FIG. 5 as well as FIG. 3B, an ovate flat mounting ring or collar 49 and a retaining nut 50 are screw threaded on the cylinder extremity with the reduced or smaller end portion 51 of he ovate collar projecting radially outward or upwardly beyond the arcuate margin of the thrust plate for screw-threaded engagement by the inner or left end of a stop rod or member 55. The latter extends longitudinally of the piston rod in overlying parallel relationship, said piston rod having its outer or right end projecting through the circular opening 47 of the thrust plate 64. For centering the rod 54 relative to the latter opening, an annular spacer or flat nut 56 is screw threaded on the rod end and has a flanged or stepped complementary periphery 57 seated in the inner or left end of said opening.

The outer or right extremity of the piston rod is supported by an ovate mounting plate or element 58, similar to the collar 49, having an apertured similar apical upper end portion 59 (FIGS. 3B and 6) and an inner annular boss portion 60 for seating engagement in the outer or right end of the opening 47 of the thrust plate 64 and for slidably accommodating said rod extremity. A screw 61 extends inwardly through the mounting element 58 into axial screw-threaded connection with the rod extremity to permit adjustment of the thrust plate relative to the rod 54. The outer or right end of the stop rod 55, which is slidable through the apertured apical portion of the mounting element, has a pair of adjusting nuts 65 threaded thereon for coacting with a nut 66 on the inner or left end of said rod outwardly or to the right of the collar portion 51 to permit variation of the effective length of said rod and prevent excessive outward movement of the piston rod 54 and its cylinder 44 as well as possible damage to the bearings. Attention is directed to the fact that the tubular shafts or tubes have walls of extreme thinness relative to the lengths of said shafts, which lengths are many times the diameters.

In addition to the medial upper opening 47 and its communicating radial slot 48, each of the thrust plates 62-64 has a pair of identical openings 67 and 77 and communicating slots 68 and 78 (FIGS. 4-6) disposed laterally of said medial opening and radial slot in its upper portion and arcuate margin 46. Even though all of the openings and slots are not functional, the identicalness of construction of the thrust plates permits greater accuracy of manufacture as well as the substitution of one plate for the other. Since the bracket 20 functions as a thrust plate, its upper portion has a trio of circular openings 70, 75 and 80 and communicating radial slots 71, 76 and 81 in its upper portion and arcuate margin 45 (FIGS. 2 and 3C) which are substantially identical to the openings 47, 67 and 77 and slots 48, 68 and 78 of the thrust plates 62-64. Manifestly, the lateral opening 75 has the inner or right end of the cylinder 42 fastened therein and the outer and/or medial portions of the cylinders 43 and 44 are slidably mounted in the openings 70 and 80 of the bracket. In the thrust plate 62, the opening 47 slidably supports the inner portion of the cylinder 44, the opening 67 has the inner or right end of the cylinder 43 fastened therein; while the outer front end of the piston rod 53 is fixed in the opening 77 of the thrust plate 63.

The cylinders 42-44 may have elongate manifolds 72-74 (FIGS. 1, 2, 3B and 3C) secured thereto in overlying longitudinal relationship for connecting hydraulic or other pressure fluid fittings 82-84 (FIGS. 1, 3B, 3C, 5 and 6) thereto substantially in accordance with our copending application, supra, the necessary flow control means being conventional and not requiring illustration. Other fittings 86-88 are connected directly to the inner ends of the cylinders. It is noted, however, that this invention is not to be limited to the actuating assembly 11 and that any suitable mechanism, such as mechanical or electrical, may be utilized to reciprocate the thrust plates and/or saw shafts relative to the base for shifting the saws to adjusted positions transversely to the direction of the lumber feed. Of course, the saw adjustment is determined by the condition of the material being ripped or sawn. Accordingly, the exact structure of the thrust plates is subject to variation; however, this does not, and is not intended to, negate the novelty of the illustrated actuating assembly and thrust plates. When the actuating means includes the described or similar elements, the openings 47, 67, 77, 70, 75 and 80 and slots 48, 68, 78, 71, 76 and 81 of the thrust plates 62–64 and bracket 20 conveniently accommodate the mounting and/or relative movement of members, such as the cylinders 42–44 and the manifolds 72–74.

OPERATION

The saws 12–14 are positioned in accordance with the condition of the lumber or other material to be ripped, the minimum spacing between said saws being shown in full lines and the maximum spacing therebetween being depicted in broken lines in FIGS. 1 and 3A. Manifestly, the increment of adjustment of the saw 14 and its tubular shaft 24 includes the reciprocal movement of the saws 12 and 13 and their shafts 22 and 23, while the reciprocation of said saw 12 and shaft 22 increases the increment of adjustment of said saw 13 and shaft 23. Ordinarily, the reciprocal movement of the saws and shafts is much greater since the commercial embodiment of the invention would have more saws and shafts, such as six. As noted hereinbefore, a greater number of saws than three can be accommodated by the length of the sawdust pit or opening 3 of the base 2. Also, additional thrust plates would be provided (one for each shaft and its saw) and each plate as well as the end bracket 20 would have additional openings and slots (one each for each cylinder and its piston rod) similar to the openings 47, 67, 77, 70, 75 and 80 and slots 48, 68, 78, 71, 76 and 81 of the thrust plates 62–64 and said bracket.

It is readily apparent that the retraction of the piston rod 52 of the cylinder 42 moves the thrust plate 62 to the left so as to draw the cylinders 43 and 44, rods 53 and 54 and plates 63 and 64 as well as all of the saws and shafts in such direction. Upon retraction of the piston rod 53 of the cylinder 43, the thrust plates 63 and 64, cylinder 44 and piston rod 54 as well as the shafts 23 and 24 and saws 13 and 14 are moved additionally in a left direction. Further movement of the saw 14, shaft 24 and thrust plate 64 to the left is accomplished by retraction of the piston rod 54 of the cylinder 44. Conversely, relative adjustment of the saws toward the right is performed by ejection or outward reciprocation of the piston rods.

The foregoing description of the invention is explanatory thereof and various changes in the size, shape and materials, as well as in the details of the illustrated construction, may be made within the scope of the appended claims without departing from the spirit of the invention.

We claim:
1. A saw apparatus including
a telescopic arbor assembly having elongate axle means and a plurality of tubular telescopic shaft means slidably mounted on and having connection with one another and the axle means for reciprocation relative to said axle means and to one another,
means for rotatably supporting said axle means,
means for imparting rotation to the shaft and axle means,
said telescopic shaft means being of less length than said axle means and of progressive radially outward decreasing length,
cutter means secured to the adjacent ends of said shaft means for reciprocal movement therewith relative to said axle means and to one another,
and actuating means coacting with the arbor assembly for imparting reciprocal movement to said shaft means relative to said axle means so as to set the cutter means in adjusted positions relative to one another and to said axle means.
2. A saw apparatus as defined in claim 1 wherein the means for imparting rotation to the telescopic shaft and axle means comprises
means for slidably connecting said telescopic shaft means to the axle means and to one another.
3. A saw apparatus as defined in claim 2 including
means for rotatably and slidably supporting the adjacent ends of the telescopic shaft means opposite the ends of said shaft means to which the cutter means are secured.
4. A saw apparatus as defined in claim 3 wherein
the means for imparting rotation to the telescopic shaft and axle means comprises
drive means and
means for slidably connecting the outermost telescopic shaft means to the drive means to permit relative reciprocal movement of said shaft means.
5. A saw apparatus as defined in claim 4 wherein
the means for slidably connecting the telescopic shaft means to the axle and drive means and to one another comprises
coacting key and keyway means extending longitudinally of said shaft and axle means,
the keyway means being of greater length than the key means to permit relative reciprocal movement of said shaft means.
6. A saw apparatus as defined in claim 5 wherein
the keyway means are longitudinally spaced progressively outward from the axle means toward the drive means.
7. A saw apparatus as defined in claim 6 wherein
the key means project transversely inward from the telescopic shaft and drive means and coact with the keyway means to drivingly connect contiguous axle, drive and shaft means to one another.
8. A saw apparatus as defined in claim 7 wherein
the key means are mounted in the telescopic shaft means and
the coacting keyway means are formed in the axle, drive and shaft means.
9. A saw apparatus as defined in claim 1 including
means for rotatably and slidably supporting the adjacent ends of the telescopic shaft means opposite the ends of said shaft means to which the cutter means are secured.
10. A saw apparatus as defined in claim 9 wherein
the means for imparting rotation to the telescopic shaft and axle means comprises
drive means and
means for slidably connecting the outermost telescopic shaft means to the drive means to permit relative reciprocal movement of said shaft means.
11. A saw apparatus as defined in claim 10 wherein
the means for imparting rotation to the telescopic shaft and axle means comprises
coacting key and keyway means extending longitudinally of said shaft and axle means,
the keyway means being of greater length than the key means to permit relative reciprocal movement of said shaft means.
12. A saw apparatus as defined in claim 11 wherein
the keyway means are longitudinally spaced progressively outward from the axle means toward the drive means.
13. A saw apparatus as defined in claim 12 wherein
the key means project transversely inward from the telescopic shaft and drive means and coact with the keyway means to drivingly connect contiguous axle, drive and shaft means to one another.
14. A saw apparatus as defined in claim 13 wherein
the key means are mounted in the telescopic shaft means and
the coacting keyway means are formed in the axle, drive and shaft means.
15. A saw apparatus as defined in claim 9 wherein
the means for rotatably and slidably supporting the opposite adjacent ends of the telescopic shaft comprises
slidably mounted thrust members having said ends of said shaft means journaled therein.
16. A saw apparatus as defined in claim 15 wherein the actuating means coacting with the arbor means for imparting relative reciprocal movement to the shaft means comprises means for imparting independent reciprocation to each of the slidably mounted thrust members.

17. A saw apparatus as defined in claim 16 wherein the means for imparting independent reciprocation to each slidably mounted thrust member comprises a pressure fluid cylinder having fixed connection with one of the thrust members and a piston rod projecting from each cylinder toward the cutter means and having fixed connection with another of said thrust members 18. A saw apparatus as defined in claim 17 including a stationary thrust member having fixed connection with the pressure fluid cylinder of the shortest telescopic shaft means for supporting said cylinder.

19. A saw apparatus as defined in claim 1 wherein the means for imparting rotation to the telescopic shaft and axle means comprises drive means and means for slidably connecting the outermost telescopic shaft means to the drive means to permit relative reciprocal movement of said shaft means.

20. A saw apparatus as defined in claim 15 wherein the means for slidably connecting the telescopic shaft means to the axle and drive means and to one another comprises coacting key and keyway means extending longitudinally of said shaft and axle means, the keyway means being of greater length than the key means to permit relative reciprocal movement of said shaft means.

21. A saw apparatus as defined in claim 16 wherein the keyway means are longitudinally spaced progressively outward from the axle means toward the drive means.

22. A saw apparatus as defined in claim 17 wherein the key means project transversely inward from the telescopic shaft and drive means and coact with the keyway means to one another.

23. A saw apparatus as defined in claim 18 wherein the key means are mounted in the telescopic shaft means and the coacting keyway means are formed in the axle, drive and shaft means.

24. A saw apparatus as defined in claim 1 wherein the means for slidably connecting the telescopic shaft means to the axle and drive means and to one another comprises coacting key and keyway means extending longitudinally of said shaft and axle means, the keyway means being of greater length than the key means to permit relative reciprocal movement of said shaft means.

25. A saw apparatus as defined in claim 20 wherein the keyway means are longitudinally spaced progressively outward from the axle means toward the drive means.

26. A saw apparatus as defined in claim 21 wherein the key means project transversely inward from the telescopic shaft and drive means and coact with the keyway means to drivingly connect contiguous axle, drive and shaft means to one another.

27. A saw apparatus as defined in claim 22 wherein the key means are mounted in the telescopic shaft means and the coacting keyway means are formed in the axle, drive and shaft means.

28. A saw apparatus as defined in claim 1 wherein the actuating means coacting with the arbor means for imparting relative reciprocal movement to the shaft means comprises means for imparting independent reciprocation to each of the telescopic shaft means.

29. A saw apparatus as defined in claim 28 wherein the means for imparting independent reciprocation to each of the telescopic shaft means comprises a pressure fluid cylinder for each shaft means and a piston rod projecting from each cylinder toward the cutter means and having fixed connection with one of the shaft means.

30. A saw apparatus as defined in claim 29 including a stationary thrust member having fixed connection with the pressure fluid cylinder of the shortest telescopic shaft means for supporting said cylinder.

31. A saw apparatus as defined in claim 1 including slidably mounted thrust members extending transversely of the telescopic shaft means for rotatably and slidably supporting the ends of said shaft means opposite to the ends thereof to which the cutter means are secured, each thrust member having nonreciprocal connection with one of said shaft means, the longer shaft means being rotatably and slidably supported by the thrust members of the shorter shaft means.

32. A saw apparatus as defined in claim 1 including a stationary thrust member having connection with the end of the shortest telescopic shaft means opposite its end to which its cutter means is secured so as to assist in supporting said shaft means.

33. A saw apparatus as defined in claim 32 including slidably mounted thrust members extending transversely of the telescopic shaft means for rotatably and slidably supporting the ends of said shaft means opposite to the ends thereof to which the cutter means are secured, each thrust member having nonreciprocal connection with one of said shaft means, the longer shaft means being rotatably and slidably supported by the thrust members of the shorter shaft means.

* * * * *

UNITED STATES PATENT OFFICE
CERTIFICATE OF CORRECTION

Patent No. 3630244      Dated December 28, 1971

Inventor(s) Jeff Y. Cromeens and Thomas E. Clyce

It is certified that error appears in the above-identified patent and that said Letters Patent are hereby corrected as shown below:

Claim 21, line 1, read --20-- for "16".

Claim 22, line 1, read --20-- for "17";

last line, after "to" and before "one" insert --drivingly connect the contiguous axle, drive and shaft means to--.

Claim 23, line 1, read --20-- for "18".

Claim 25, line 1, read --24-- for "20".

Claim 26, line 1, read --24-- for "21".

Claim 27, line 1, read --24-- for "22".

Signed and sealed this 28th day of November 1972.

(SEAL)
Attest:

EDWARD M. FLETCHER, JR.
Attesting Officer

ROBERT GOTTSCHALK
Commissioner of Patents